Figure 1:
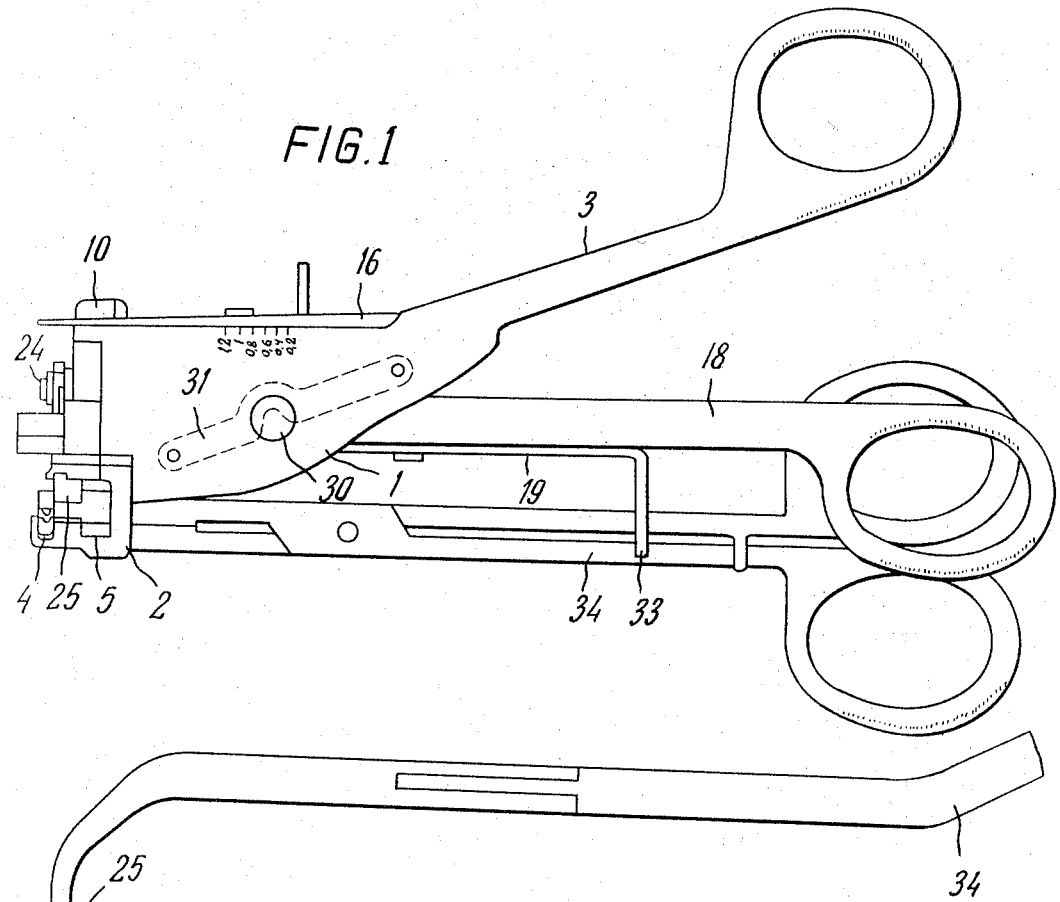

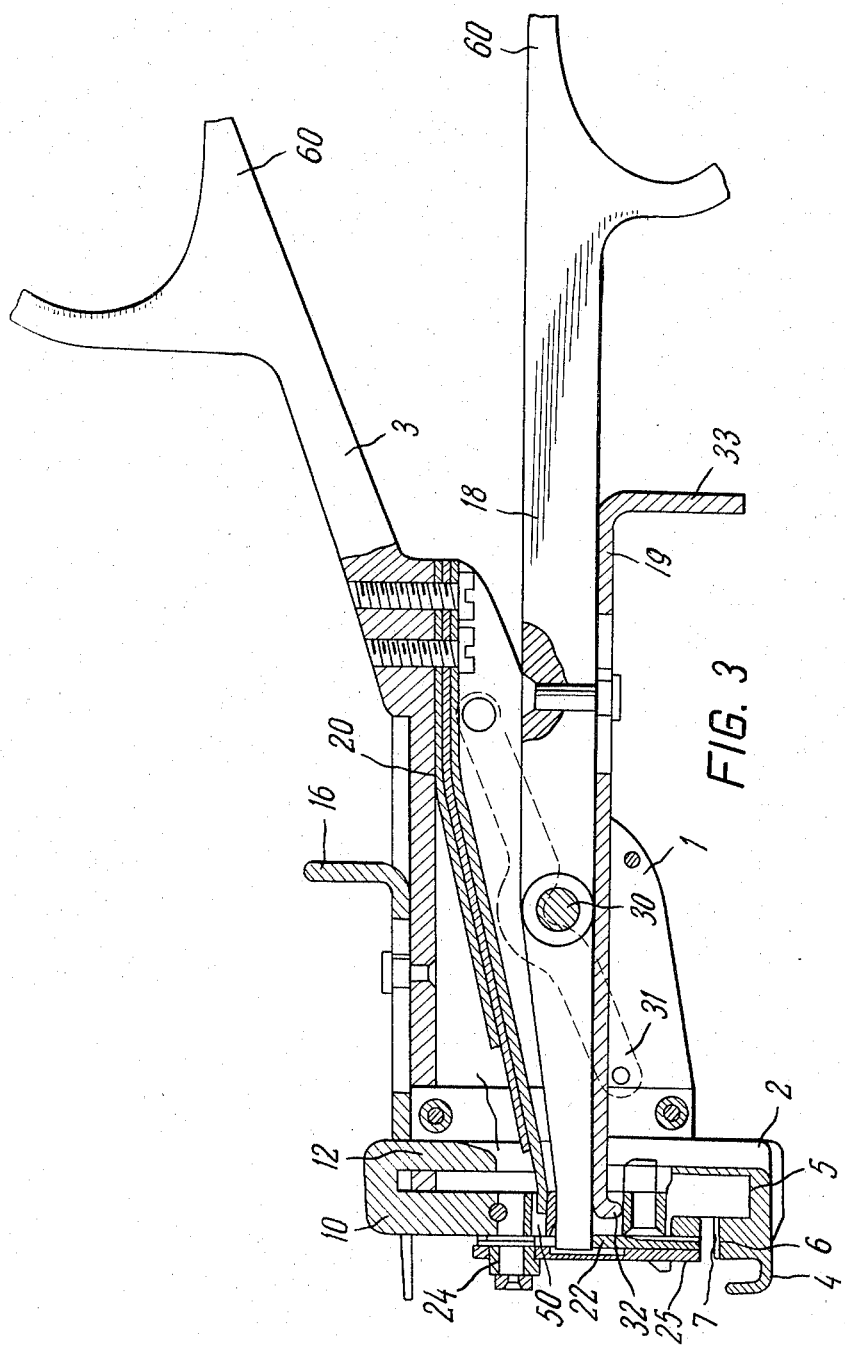

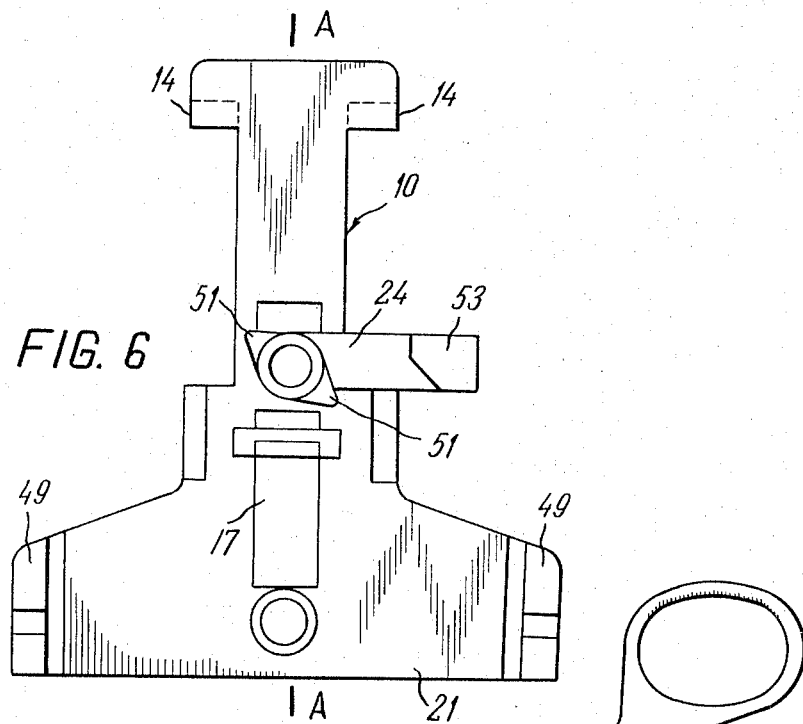
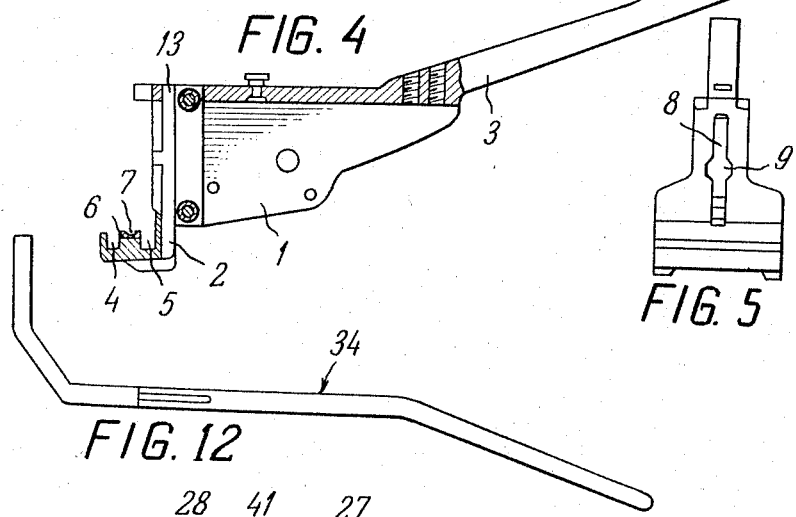
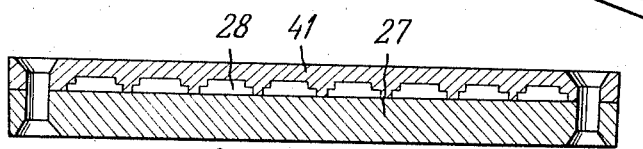

April 18, 1967  N. N. KAPITANOV ETAL  3,314,581
MULTI-STAPLE INSTRUMENT FOR PLACING
A LONGITUDINAL VASCULAR SUTURE
Filed May 14, 1964  5 Sheets-Sheet 4

United States Patent Office 3,314,581
Patented Apr. 18, 1967

3,314,581
MULTI-STAPLE INSTRUMENT FOR PLACING A LONGITUDINAL VASCULAR SUTURE
Nickolai Nickolajevich Kapitanov, Natalija Petrovna Petrova, and Nina Vasiljevna Jurasova, all of Moscow, U.S.S.R., assignors to Nauchno-Issledovateljsky Institute Experimentaljnoi Khirurgicheskoi Apparatury and Instrumentov
Filed May 14, 1964, Ser. No. 367,371
2 Claims. (Cl. 227—142)

This invention relates to an instrument for placing a longitudinal suture by means of metal staples on a vascular wall. The invention contemplates in its widest sense the suturing of vessels by means of metal staples. The invention is particularly directed to the treatment of arterial, arteriovenous aneurysms after incision of an aneurysmatic sac when the cut edges of the wall of both artery and vein are to be sutured. Longitudinal sutures are placed on vessels in cases of vascular injury as well as in cases of thromboectomies resulting from removal of a thrombus or a temporary blockage.

Thrombintimaectomy is often performed for the treatment of arteriosclerous occlusions of vessels instead of plastic replacements of defective portions of a vessel, said thrombintimaectomy being effected through longitudinal incisions in the vascular wall with subsequent suturing thereof.

Instruments for placing a longitudinal suture by means of metal staples on the vascular wall are known.

These known instruments permit the applying of single staples, the distance between two adjacent staples being determined visually. This results in a suture which is rough, insufficiently hermetic, and if it is rather long the process of suturing takes much time and requires great attention.

Though there have been attempts to overcome the above mentioned difficulties and disadvantages, they have not been successful. We have solved this problem and have produced an instrument which is capable of overcoming the known disadvantages.

In this regard it is an object of the present invention to provide an instrument for producing a smooth, hermetic longitudinal suture on the vascular walls with a minimum decrease of vessel cross-section.

Another object of the present invention is to provide an instrument convenient in operation and having the capability of placing sutures quickly for great lengths.

The instrument according to the invention for placing a longitudinal suture on the vascular walls produces staple-to-staple distances which are exactly predetermined, reduces the operational time, insures a smooth hermetic suture, prevents the edges of a vessel which is being sutured from slipping off the instrument and enables placing a suture on the very edge of the incision, due to which the decrease of the vessel cross-section is minimal. Provision is made in the present instrument for uniform bending of the staples while preventing premature ejection of the staples.

It is a feature of the invention that the instrument is actuated for suturing with a finger of the same hand that holds it.

Figure 2:
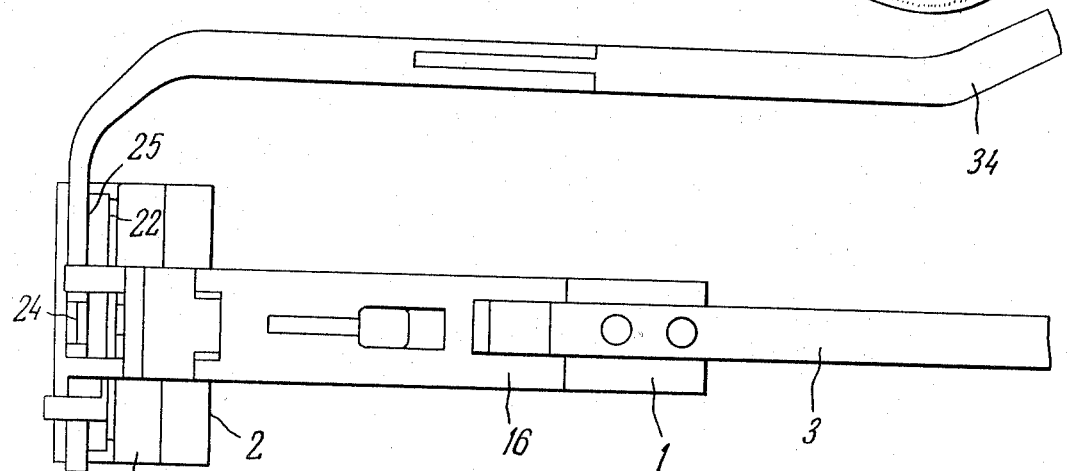
Figure 14:
Figure 15:
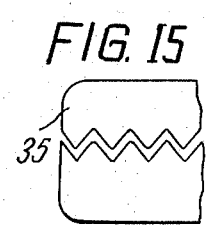
Figure 7:
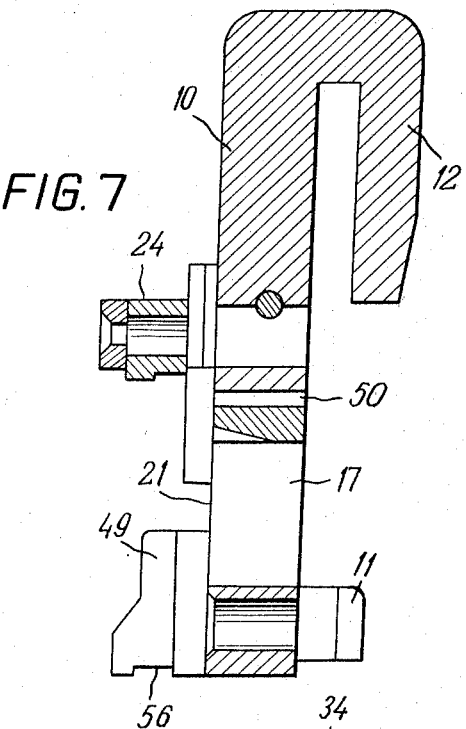
Figure 16:
Figure 17:
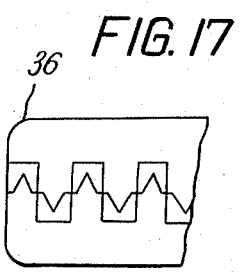
Figure 13:
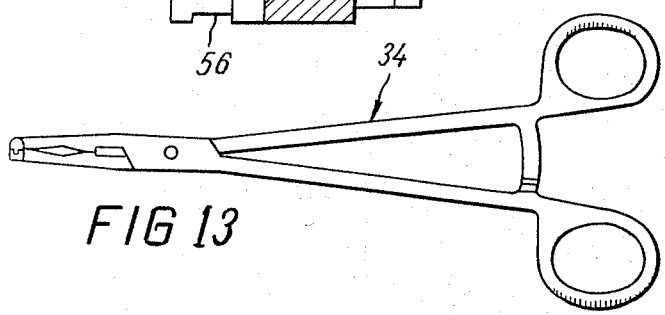
Figure 8:
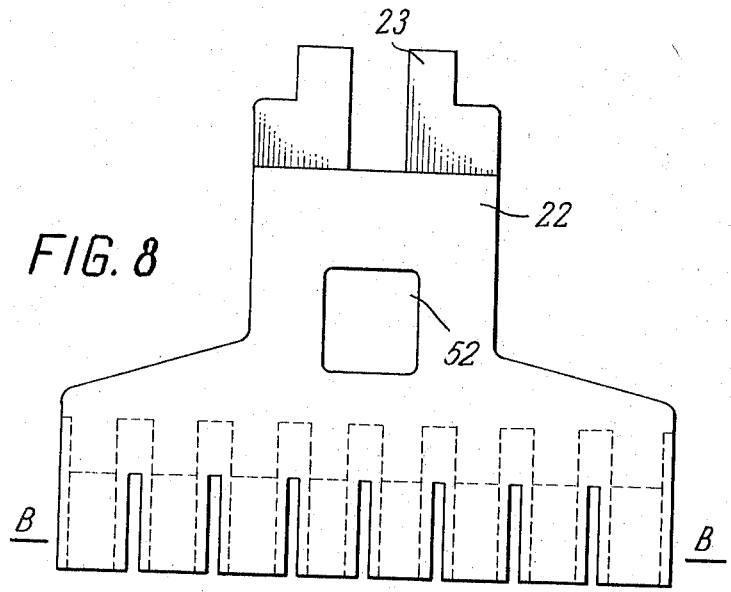
Figure 9:
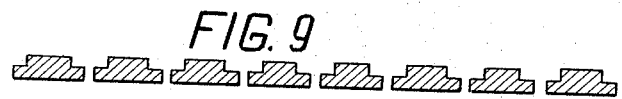
Figure 10:
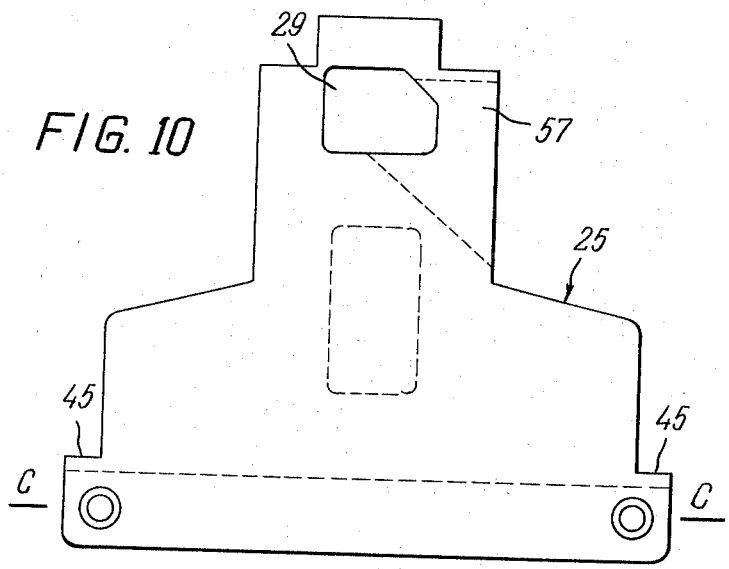

Other objects and advantages of the invention will be evident from the following detailed description of the invention with reference to the accompanying drawings, in which:

FIGURE 1 is a side view of the instrument showing its engagement with a clamp;
FIGURE 2 is a top view of the instrument and clamp of FIG. 1;
FIGURE 3 is a side view of the instrument of FIG. 1 partially in section;
FIGURE 4 is a side view of the body of the instrument partially in section;
FIGURE 5 is an end view of the body of FIG. 4;
FIGURE 6 is an end view of a carriage of the instrument;
FIGURE 7 is a cross-section through the carriage, taken along lines AA in FIG. 6;
FIGURE 8 is an end view of a pusher of the instrument;
FIGURE 9 is a cross-section through the pusher, taken along lines BB in FIG. 8;
FIGURE 10 is an end view of a magazine of the instrument;
FIGURE 11 is a cross-section through the magazine taken along lines CC in FIG. 10;
FIGURE 12 is a top view of the clamp of FIG. 1;
FIGURE 13 is a side view of the clamp;
FIGURE 14 is a cross-sectional view of the jaws of the clamp;
FIGURE 15 is a side view of the jaws of the clamp;
FIGURE 16 is a cross-sectional view of the jaws of a second clamp; and
FIGURE 17 is a side view of the jaws in FIG. 16.

The instrument is composed of a body 1 which has a supporting jaw 2 and a handle 3.

The supporting jaw 2 has two horizontal grooves 4 and 5 between which there is fixed a die 6 with depressions 7 for bending the ends of staples, and a vertical groove 8 with an enlargement or expansion 9 in the middle thereof.

A carriage 10 is connected to the supporting jaw 2 of body 1 by means of a T-shaped pin 11 (FIG. 7) which enters vertical groove 8 through expansion 9 and slides therein, and by a shank 12 which enters a groove 13 in jaw 2, as seen in FIG. 3.

Carriage 10 has two projections 14 with bevelled surfaces 15 which rest upon a gap adjusting device 16 as seen in FIG. 3. The gap adjusting device 16 is movably joined with body 1 and upon movement of gap adjusting device 16, carriage 10 is moved up or down, thereby increasing or decreasing the stitching gap, as will be seen more fully hereinafter.

The carriage 10 is provided with an aperture 17 which receives a lever 18 and a protector 19, as seen in FIG. 3.

A spring 20 is fixed on the internal side of body 1 and engages in an aperture 50 in carriage 10 to urge carriage 10 downwardly so that beveled surfaces 15 engage the gap adjusting device 16.

A pusher 22 slides along surface 21 of carriage 10, fork-shaped shank 23 of the pusher (FIG. 9) embracing the spindle of a turnable cam 24 of carriage 10, as seen in FIG. 3. The pusher 22 has an opening 52 which receives lever 18.

Cam 24 and actuating handle 53 secured thereto, serve to fix an interchangeable magazine 25 on carriage 10, as will be described more fully hereinafter.

Magazine 25, as seen in FIGS. 10 and 11, consists of two joined plates 26 and 27, plate 26 having slots 28 for receiving staples while plate 27 has an opening 29 for receiving cam 24.

The cam 24 has projecting lugs 51, which in a vertical position secure the magazine (FIG. 3), whereas, when the handle 53 is turned to position the lugs 51 as shown in FIG. 6, the magazine is removable. In order to mount the magazine on the carriage, the opening 9 of the magazine is passed over the lugs 51 of the cam as positioned in FIG. 6, while the actuator arm 53 is received in a groove 57 in plate 26 and lateral projections 45 on the magazine are positioned beneath grooves 56 in lugs 49 on carriage 10. When the actuator arm is turned downwardly from the position in FIG. 6, the upper lug 51 engages the magazine in opening 29 to lift the magazine and cause the engagement of the projections 45 in grooves 56, while the lower lug 51 passes on the outer surface of the magazine to secure the magazine against the carriage.

Movement of carriage 10 and pusher 22 is achieved by means of lever 18 which is rotatably mounted on spindle 30 which is secured on body 1 by means of a lock member 31.

The protector 19 is movably connected to lever 18. An end 32 of the protector enters opening 17 of carriage 10 under lever 18 and does not allow movement of lever 18 in opening 17, thereby preventing premature ejecting of staples from the magazine.

The other end 33 of protector 19 has the shape of a trigger for a convenient grip, to enable retraction of protector 19 from opening 17.

The instrument is supplied with two clamps which permit placement of a longitudinal vascular suture.

One of the clamps, designated 34, is shown in FIGS. 12 and 13. The other clamp has the same overall shape as shown for clamp 34 in FIGS. 12 and 13 and differs only in the shape of the teeth of its jaws.

The width of the jaws 35 of clamp 34 is equal to the width of groove 4, to permit insertion therein, as shown in FIG. 1, whereas the width of the jaws 36 of the other clamp is less than that of the groove 5. For convenience of operation, the clamps have a curved shape.

Clamp 34 is designed for soft compression of the vascular wall and has a tooth shape, as seen in FIGS. 14 and 15, to enable it to be applied to the vascular wall without reaching the site of suturing.

The other clamp is designed for grasping the organ to be sutured beyond the line of the suture and is intended for suturing organs whose walls separate after being incised, such as intestines. For this purpose, the jaws 36 of the other clamp have serrations arranged in a staggered fashion, as seen in FIGS. 16 and 17.

The instrument operates as follows: The jaws of clamp 34 are applied to approximated edges of an incision made in the vascular wall so that the edge of the jaws and the edge of the incision are 2 to 2.5 mm. apart. The assembled instrument, complete with a loaded magazine and the gap adjusting device 16 set for a required gap, is opened by moving rings 60 apart. The instrument is then engaged with clamp 34 by engaging clamp jaws 35 in groove 4 of lower jaw 2. Then the rings 60 of the instrument are brought together, at which time the carriage with the magazine approaches the supporting jaw 2 of the instrument as close as the preset gap adjusting device 16 permits, thus compressing the vascular wall. Holding the instrument by the ring, an operator, with a finger of the same hand that holds the instrument, first presses trigger 33 of the protector to retract the same and then closes both rings to perform a suturing operation. By closure of the rings 60, the pusher 22 is depressed by lever 18 and enters slots 28 in magazine 25 to drive the staples into the vascular wall and bend the staples on die 7. Then the rings are moved apart and the instrument is removed from the clamp jaws. Next the clamp is transposed for suturing the adjacent area of the vessel and the magazine is changed. For this purpose lever 18 is fixed in position by protector 19 by moving the latter forward until it reenters opening 17 of carriage 10 and the cam is turned up to enable release of magazine 25. Then, by pressing with a finger on the lower edge of the magazine, the operator removes the latter and puts a new one in place, thereafter turning the cam down to lock the new magazine in place. This done, the instrument is again ready for suturing.

If it is desired to place a longitudinal suture on an organ whose walls separate after being incised, for instance, intestines, or when placing the first row of sutures on the wound of a bladder, the clamp with the jaws 36 is used. When using this clamp, the jaws 36 are applied as close to the edge of the incision as possible. The instrument is then engaged with this clamp by receiving the jaws 36 in groove 5. The suturing operation, as described above for clamp 34, is then carried out.

The embodiment of the invention herein described represents only one of the preferable variants of the invention and it is possible to utilize other variants as regards form, dimensions and disposition of individual elements. For example, the parts shown in the drawings and described above may be substituted by equivalents and the position of individual parts may be altered, but such changes are deemed to be within the scope of the invention if defined in the following claims.

What is claimed is:

1. A multi-staple instrument for suturing a vessel comprising a body including a supporting jaw and a handle, said supporting jaw including a die provided with depressions for bending the legs of staples and having at least one horizontal groove therein for receiving clamp means secured to the vessel to position the vessel in staple receiving position, a carriage mounted slidably on said body for movement towards and away from said jaw, a magazine for staples replaceably supported on said carriage, actuator means pivotally mounted on said handle and engaging said carriage for displacing the same along said body, adjusting means slidably supported on said body and engageable with said carriage to limit sliding movement thereof to a selected distance from the supporting jaw, protector means slidably supported on the actuator means for movement between operative and inoperative positions, said protector means in the operative position engaging said carriage and the actuator means to prevent movement of the actuator means relative to said carriage and in said inoperative position being out of engagement with said carriage, and pusher means slidably mounted in said magazine and engaged with the actuator means for driving staples from the magazine upon pivotal movement of the actuator means after the protector means has been moved to inoperative position.

2. The combination as claimed in claim 1, wherein said supporting jaw has two horizontal grooves located on opposite sides of the die.

References Cited by the Examiner
UNITED STATES PATENTS 2,874,384  2/1959  Krone.
2,891,250  6/1959  Hirata.
3,080,564  3/1963  Strekopitov et al.

GRANVILLE Y. CUSTER, Jr., *Primary Examiner.*